US008204313B2

(12) United States Patent
Wheeler et al.

(10) Patent No.: US 8,204,313 B2
(45) Date of Patent: Jun. 19, 2012

(54) RAPID, SPATIAL-DATA VIEWING AND MANIPULATING INCLUDING DATA PARTITION AND INDEXING

(75) Inventors: Mark Damon Wheeler, Monte Sereno, CA (US); Barry Joel Schwarz, Berkeley, CA (US); Richard William Bukowski, Orinda, CA (US); Minghua Wu, Fremont, CA (US)

(73) Assignee: Leica Geosystems AG, Heerbrugg (CH)

( * ) Notice: Subject to any disclaimer, the term of this patent is extended or adjusted under 35 U.S.C. 154(b) by 960 days.

(21) Appl. No.: 12/202,976

(22) Filed: Sep. 2, 2008

(65) Prior Publication Data

US 2009/0060345 A1    Mar. 5, 2009

Related U.S. Application Data

(60) Provisional application No. 60/968,948, filed on Aug. 30, 2007.

(51) Int. Cl.
*G06K 9/46* (2006.01)
*G06F 7/00* (2006.01)
*G06F 17/30* (2006.01)

(52) U.S. Cl. ......... 382/195; 707/711; 707/741; 707/797

(58) Field of Classification Search .................. None
See application file for complete search history.

(56) References Cited

U.S. PATENT DOCUMENTS

| 6,463,180 | B1* | 10/2002 | Krishnaswamy | 382/240 |
| 7,379,936 | B2* | 5/2008 | Kothuri et al. | 1/1 |
| 2002/0169784 | A1* | 11/2002 | Cha et al. | 707/102 |
| 2005/0203930 | A1* | 9/2005 | Bukowski et al. | 707/100 |

OTHER PUBLICATIONS

A. Guttman, "R-tree: a dynamic index structure for spatial searching", Proc.ACM Sigmod, 1984.*
T. Sellis, et al. "The R+-tree: a dynamic index for multi-dimensional objects", Proceedings of the 13th conference on very large database, 1987.*
Frank, Andrew U. and R. Barrera, "The Fieldtree: a data structure for geographic information systems", Symposium on the design and implementation of large spatial databases, 1990.*

* cited by examiner

*Primary Examiner* — Li Liu
(74) *Attorney, Agent, or Firm* — Maschoff Gilmore & Israelsen

(57) ABSTRACT

A high-density, distance-measuring laser system and an associated computer that processes the data collected by the laser system. The computer determines a data partition structure and stores that structure as a header file for the scan before data is collected. As the scan progresses, the computer collects data points until a predetermined threshold is met, at which point a block of data consisting of the data points up to the threshold is written to disk. The computer indexes each data block using all three coordinates of its constituent data points using, preferably, a flexible index, such as an R-tree. When a data block is completely filled, it is written to disk preferably with its index and, as a result, each data block is ready for access and manipulation virtually immediately after having been collected. Also, each data block can be independently manipulated and read from disk.

7 Claims, 7 Drawing Sheets

RAPID, SPATIAL-DATA VIEWING AND MANIPULATING INCLUDING DATA PARTITION AND INDEXING

CROSS-REFERENCE TO RELATED APPLICATIONS

This application claims the benefit of U.S. Provisional Application No. 60/968,948 filed Aug. 30, 2007, which is incorporated herein by reference in its entirety.

BACKGROUND

Laser distance-measuring systems measure space to such a high degree of measurement density that the resultant mass of points, often called a point cloud, can appear as a coherent scene in the manner of a pointillist painting. Systems meeting this description include the laser scanner described in U.S. Pat. No. 5,988,862, the disclosure of which is hereby incorporated by reference, the Leica HDS6000 laser scanner from Leica Geosystems HDS, LLC, of San Ramon, Calif., or other LIDAR systems—such as the airborne LIDAR system disclosed in U.S. patent application Ser. No. 11/397,246 filed Apr. 4, 2006, and incorporated herein by reference. Each of these systems produce point clouds or sets of echoes, which are data sets representing points whose position and distance are sensed by the system.

Typically, the systems collect data in such a way to transform raw sensor data into point data that have three position coordinates, x, y, and z. The raw sensor data is expressed in spherical coordinates: an angle $\theta$ that represents the angle of rotation about a vertical axis (shown as the z-axis in FIG. 4 of U.S. Pat. No. 5,988,862), an angle $\phi$ that represents the angle of rotation about a horizontal axis (shown as the y-axis in FIG. 4 of the '862 patent) and a range or distance $\rho$. The angle coordinates correspond with the movable laser-scanner or LIDAR components that determine the direction of an emitted laser pulse. These spherical coordinates are transformed into Cartesian coordinates, which are more convenient for later operations on the data. Once transformed, the z coordinate corresponds to the range $\rho$ and represents the distance of a point from the laser scanner. (We have moved from defining the z-axis as shown in FIG. 4 of the '862 patent to the definition shown in FIG. 6A of that patent. We adhere to the definition of the x-, y-, and z-axes shown in FIG. 6A for the remainder of this specification, but one of ordinary skill will appreciate that the label attached to the Cartesian axes is arbitrary.) The aggregated z coordinates of points in a point cloud generally do not follow a predicable pattern. Indeed, the z coordinates of points are determined by the objects in the space that the laser system is measuring. In contrast, the x and y coordinates of points follow a pattern because the laser systems—whether a laser scanner or aerial LIDAR-collect data in a regular pattern.

But using the data from three-dimensional ("3D") laser scanners is typically a time-consuming process. Current-generation laser scanners collect data at a rate much faster than the accompanying software can process it in real time. Some current laser scanners can collect data as fast as 500,000 data points per second. Near-term 3D imagers (based on grids of collectors similar to CCDs) may soon reach 30 million data points per second (30 Frames/sec at 1 K×1 K points=1 M points per frame).

This produces a lot of data. Typically a 3D data point will carry along somewhere between 14 to 30 bytes of data depending on the resolution of the device and the attributes associated with each point (e.g., 12 bytes for float precision points, 24 bytes for double precision points, 2 bytes for intensity return, 3 bytes for color). Consider a 14-byte-per-point baseline laser-scanner system. This system produces a data rate of roughly 7 MB/sec at a scan rate of 500 K points/sec. Given that disk write speeds are roughly 30 MB/see, the system already runs close to the limits of practical data collection and storage.

After collection, the point cloud data files must usually be processed and spatially indexed for efficient use and ability to visualize the collected data. Since the data generally is acquired in a two-dimensional ("2D") grid, the data is generally stored in 2D grid order (allowing for some spaces that occur when an emitted laser pulse is never reflected back to the system and collected). To look at all the data in 3D generally requires several days to index the data in 3D on a high-end desktop PC for a day's collection of points. As such, this format conversion generally takes significantly longer than the collection time. This conversion is necessary for most uses of scan data since it is typical to combine data from multiple positions to represent the scanned scene. In this usage, the 2D scan formats are practically of no use.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One embodiment disclosed herein relates to using a computer for rapidly displaying and manipulating a point cloud composed of a plurality of data expressing three-dimensional attributes. The point cloud results from a scan with a laser system. The method includes the steps of: determining a partition structure based on the size of the point cloud and a predetermined leaf-block size; initiating the scan; adding data to memory as it is collected until the data reaches the leaf-block size; indexing data as the data is collected, wherein indexing includes establishing a boundary based on three-dimensional attributes of the data; storing the boundary when the data indexed according to the indexing step reaches a predetermined node capacity; and storing the data of the leaf-block size to form a leaf block. The partition structure includes a leaf-node having a leaf-node capacity substantially equal to the predetermined leaf-block size, and the leaf-node composes the highest level of the partition structure, which includes at least the highest level and a lower level composed of at least one lower-level node. The predetermined node capacity is the capacity of a node in the partition structure.

Another embodiment disclosed herein relates to using a laser-measurement device that collects data having three-dimensional attributes, the data having a regular pattern in two dimensions. The method includes the steps of determining a partition structure for the data based on the regular pattern before initiating a scan; initiating the scan and, while the scan progresses, collecting the data in memory until the data fits a size criteria associated with the partition structure; writing a block of data to disk when the data fits the size criteria; before writing the block to disk, establishing an index based on the three-dimensional attributes of the data; and querying the data. The index corresponds to the block of data. Querying includes the steps of determining a spatial query and comparing the spatial query to the index.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale. Well-known devices and processes have been excluded so as not to obscure the discussion in details that would be known to one of ordinary skill in the art.

The principles of the present invention generally relate to a laser scanner, aerial LIDAR or other high-density, distance-measuring laser system and an associated computer that processes the data collected by the laser system. The computer determines a data partition structure and stores that structure as a header file for the scan even before data is collected. As the scan progresses, the computer collects data points until a predetermined threshold is met, at which point a block of data consisting of the data points up to the threshold is written to disk. The data block may be a leaf-block of the partition structure (i.e., a member of the highest level of the partition), an intermediate block or the root block. In other words, preferably, points are collected and filled into the appropriate blocks at every level of the partition as the scan progresses.

The computer indexes each data block using all three coordinates of its constituent data points using, preferably, a flexible index, such as an R-tree. As mentioned before, when a data block is completely filled, it is written to disk preferably with its index and, as a result, each data block is ready for access and manipulation virtually immediately after having been collected. Also, each data block can be independently manipulated and read from a disk. It will be appreciated that any computer implementing the embodiments disclosed herein will include well-known computer components such as, but not limited to, RAM and other high speed memory, a storage disk such as a hard drive or the like, a display screen, input devices such as a keyboard and mouse, and one or more interfaces that allow the computer to transmit and receive data.

Figure 1:
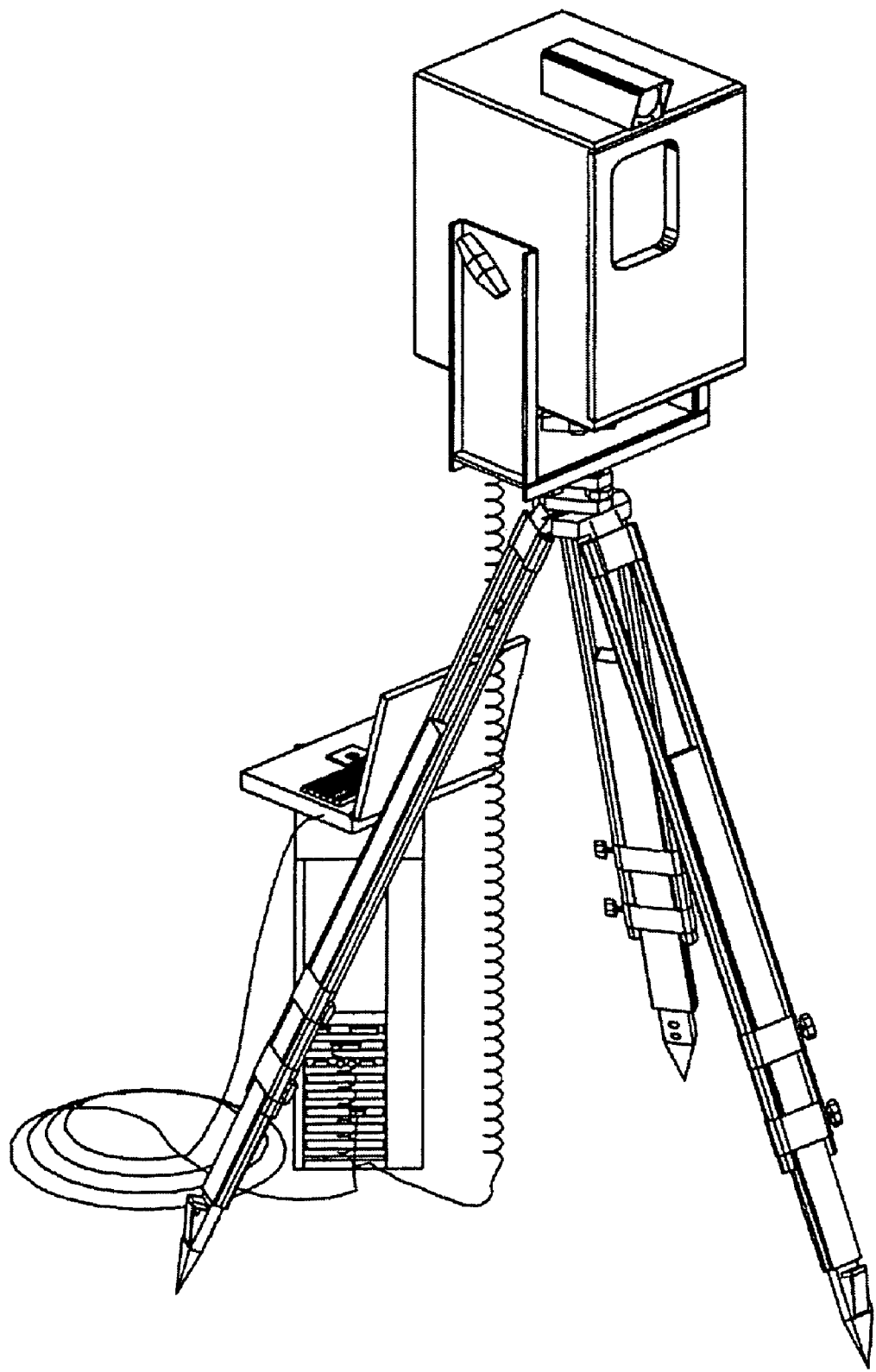
FIG. 1 illustrates a laser scanner.
Figure 2:
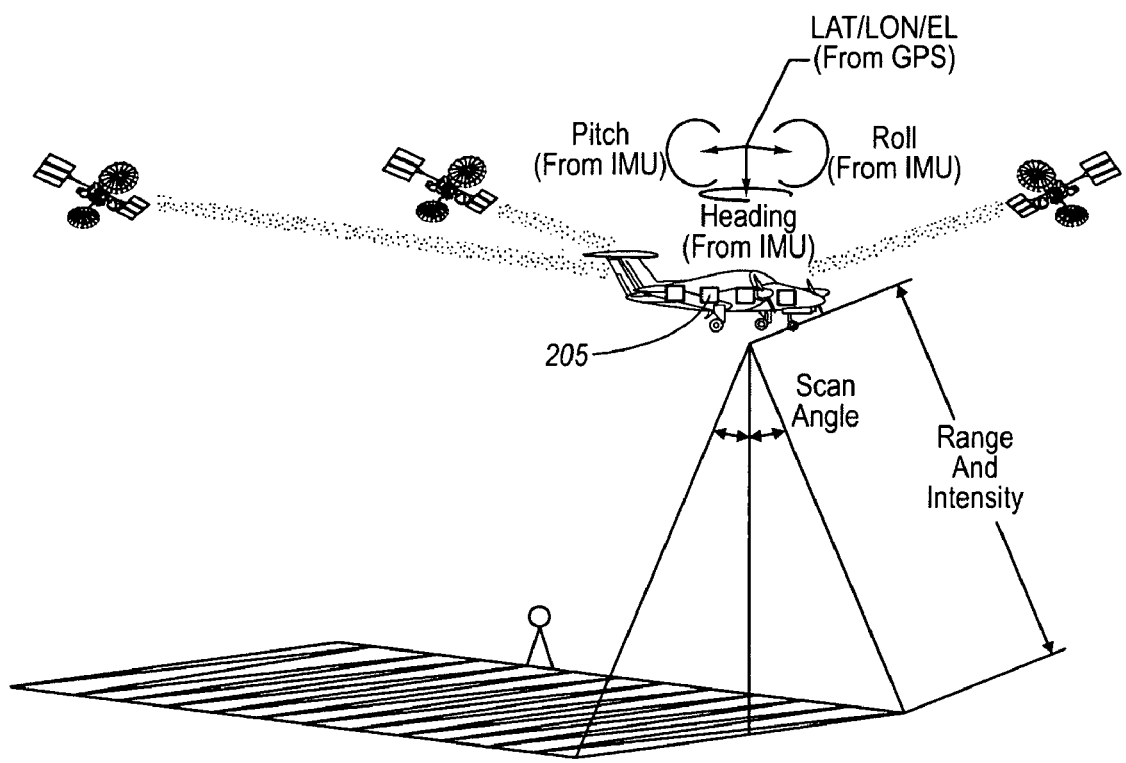
FIG. 2 illustrates a LIDAR system.
Figure 3:
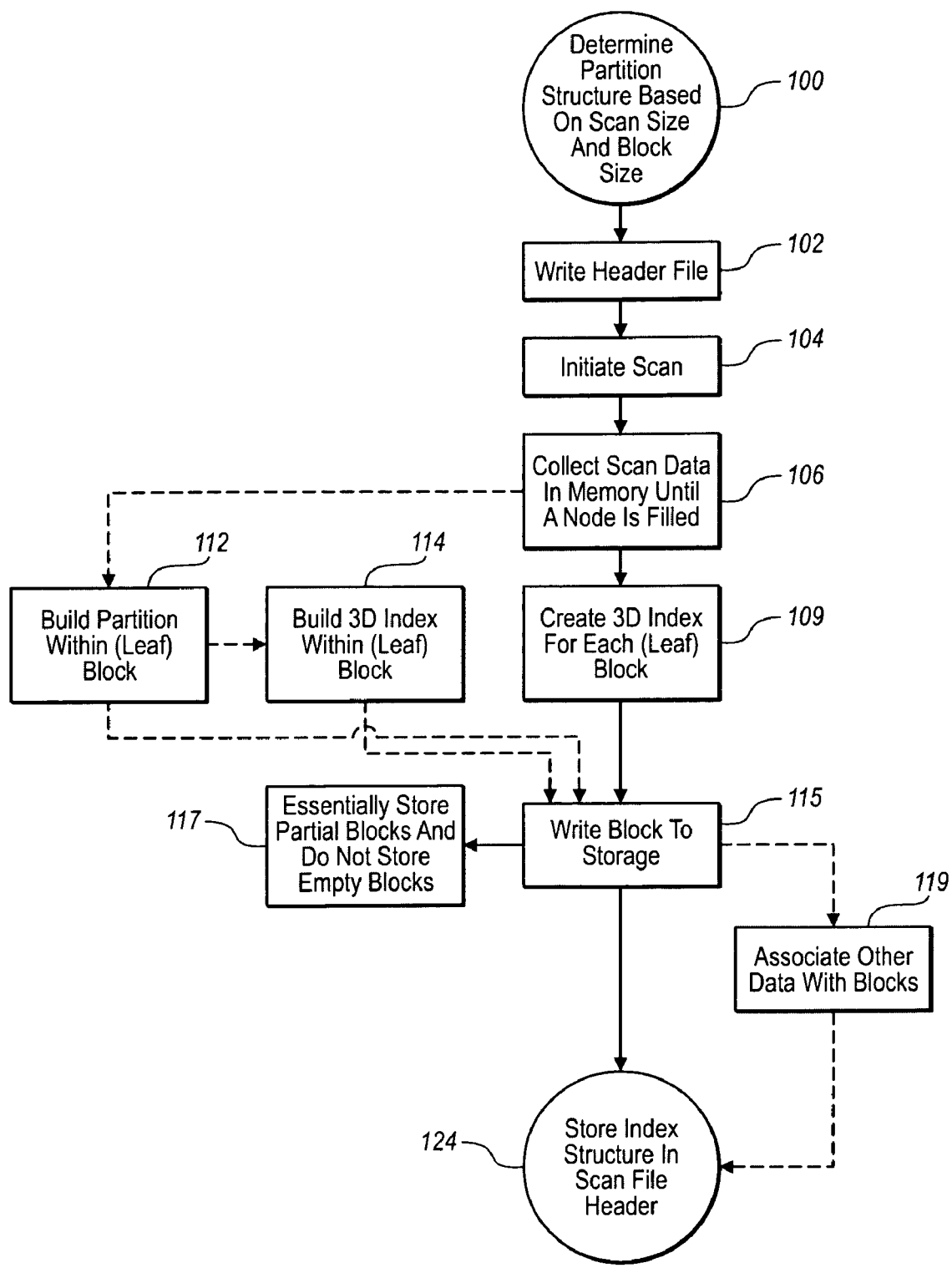
FIG. 3 is a flow-chart illustrating the process for storing points according to the preferred embodiment of the invention.

Having generally described the principles of the present invention, attention is first made to FIG. 3, which in greater detail illustrates an embodiment disclosed herein. Initially, as shown in Step 100 in FIG. 3, a computer associated with a laser system determines a partition structure for a scan, based on the scan size and the highest-level block size for the partition. It will be appreciated that the laser system that will perform the scan may be the laser scanner shown in FIG. 1. Additional detail regarding the laser scanner of FIG. 1 may be found in relation to FIG. 3A of U.S. Pat. No. 5,988,862. The laser system may also be the LIDAR system including a LIDAR 205 shown in FIG. 2. Additional detail regarding the LIDAR system of FIG. 2 may be found in relation to FIG. 3 of U.S. patent application Ser. No. 11/397,246. The laser system may also be any other suitable laser-ranging system that collects range data in a regular pattern in two dimensions. Note that U.S. Pat. No. 5,988,862 and U.S. patent application Ser. No. 11/397,246 have previously been incorporated by reference in their entirety.

It will be appreciated that the scan size can be determined by a user and input into the computer. Data block size may be input directly or may be inferred from more general information that a user inputs to the computer. Typically, the data block size is specified as a number of columns and rows of data. As will be discussed in more detail to follow, for efficient usage the preference is that the data block be square and a power of 2 (i.e., that is canonical), as this reduces memory requirements and computation. Of course, it will be appreciated that non-canonical data blocks are also envisioned by the principles of the present invention.

The size of the scan is typically determined by the resolution of the scan (i.e., the closeness of collected data points) and the area covered by the scan. In a laser scanner such as the scanner disclosed in U.S. Pat. No. 5,988,862 shown in FIG. 1, the area covered by the scan may be specified by the extent of rotation about the vertical axis of the scanner (that is, the axis perpendicular to the floor)—which with the resolution determines the number of columns of data in the entire scan—and the field of view of the scan (that is, the swath of the scan in a plane perpendicular to the floor)—which with the resolution determines the number of rows in the entire scan. Likewise, it will be appreciated how these principles may be applied to additional scanners such as the HDS6000, to LIDAR systems such as the system shown in FIG. 2 or to various other systems that collect position data in a regular way.

The computer may then determine a partition structure. This may be done before initiating a first laser pulse of a scan because laser systems generally collect data in a regular, or almost regular, pattern in two-dimensions. Preferably, the partition structure is set so that the total data collected during the scan will be partitioned as a set of canonical data blocks. The data blocks form the basis of lower levels of detail, or low-level nodes, often called leaf-nodes in many partition structures. The information describing such canonical data blocks is algorithmic, whereby the computer need only store a data block index describing the location of a data block on a storage disk, and need not store a large file describing the data structure.

To more fully understand the nature of canonical data blocks, consider the following case. Let N define the row and column size of the data blocks, which are a unit of storage in a file format (i.e., each data block contains a grid of N×N points). The full grid row-and-column count of the entire scan is M, which is defined to be a power of two and is divisible by N, which is also a power of two. The full row count and full column count is set to be equal. This gives a canonical grid, which can be evenly subdivided into (M/N)×(M/N) leaf data blocks.

Figure 4:
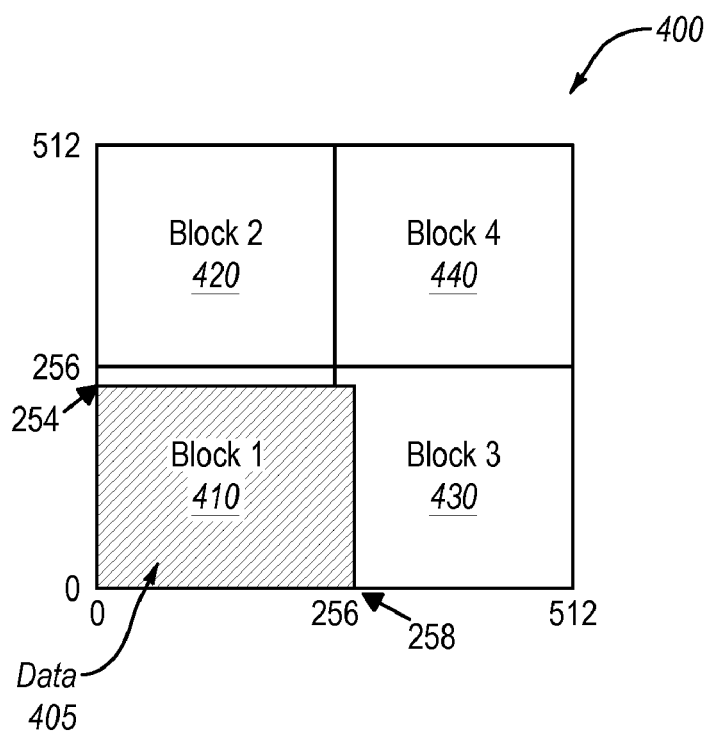
FIG. 4 is an illustration of scan size versus canonical block definition.

Note that in some embodiments the actual number of data points in each data block, or in any block composing the canonical grid, may be less than N×N because the extent of the scan may only partially fill some blocks as may be seen in FIG. 4. In other words, in these embodiments if the scan size is not a power of 2 or evenly divisible by N, the computer creates the smallest canonical structure big enough to hold the scan. This means there may be empty data points and possibly empty data blocks, but these can be represented with very little computing overhead. Also, some points will have an intensity of zero and perhaps a null range because no valid return was received for the position represented by the point.

As will be described in greater detail below with respect to FIG. 8, this canonical grid also forms the basis for a canonical partition, preferably a quad-tree partition, of a total number of levels that is equal to $1+\log_2(M/N)$. For each level L in the quad-tree or other partition, a subsample version of the scan is stored, using $2^L$ by $2^L$ data blocks from the next-highest level. If level zero is the lowest level (i.e., having the lowest resolution), a single 2° by 2° data block of data points results, which is an N×N point sub-sampling of the entire scan. At each subsequent level, each data block is subdivided into four data blocks: so, for example, level 1 would have four $2^1$ by $2^1$ blocks of data representing the entire scan.

The foregoing explains that the partition structure is predictable and consistent in two dimensions because of the nature of laser system data. That is, the data points can be partitioned into data blocks based on the two-dimensional regularity of the data points, and these data blocks are of consistent size. The data blocks themselves can be grouped together to form additional levels of a quad-tree or other partition structure.

Returning now to FIG. 3, having predetermined each node of the partition structure based all the scan size and data block size, the computer writes a scan-file header, or a header for the entire scan, in Step 102. The header establishes the nodes of the partition, i.e., the index from the to-be-collected quad-tree data blocks, or partition data blocks, to the storage of the block on the disk.

Next, in Step 104, the computer initiates the scan in response to user input. The laser system begins collecting data points, which are stored in memory in Step 106 as they are collected. As mentioned earlier, several nodes of a partition at various levels in the partition may be stored in memory as data points are collected that belong in those nodes. If a user were to see an imaginary, graphical representation of real-time collection of data points in memory, he or she would see leaf-nodes filling with data points at the same time as intermediate node. Each intermediate node having, for a quad-tree partition, an area four times as large as any given leaf-node composing a quarter of the intermediate node, also fill with data points but more slowly and at a lower density. Leaf-nodes fill first and are flushed from memory as they are written to disk. The last node to be completed is the root node, which is written to disk when the scan is completed.

Returning again to FIG. 3, as data points are collected in memory, the computer in Step 109 creates a 3D index for each node. The 3D index preferably uses a bounding box principal such as an R-tree index, although other bounding principles may also be used. In an R-tree, each node contains a bound for all child nodes, and child nodes can overlap. This well suits a laser scanner, because, as shown in FIG. 5, when data is taken from a single position the bounding boxes can overlap.

Figure 5:
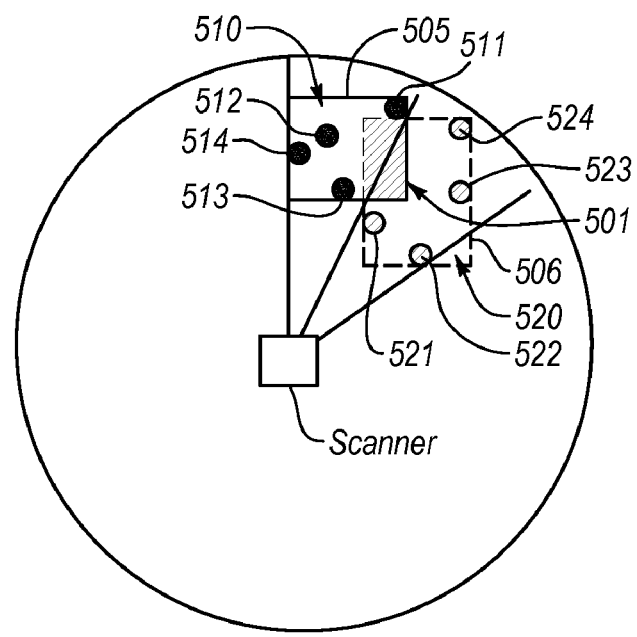
FIG. 5 illustrates overlapping bounds 3D points.

FIG. 5 shows two bounding boxes 505 (solid lined box) and 506 (dashed line box), which index a data block 510 (also referred to as Block 1) and a data block 520 (also referred to as Block 2) respectively. As shown, data block 510 is composed on data points 511, 512, 513, and 514 while data block 520 is composed on data points 521, 522, 523, and 524. While each data block does not intersect the other because of the periodic or regular nature of laser scanner data in two dimensions described previously, the 3D-Cartesian bounding boxes 505 and 506 can overlap as shown at by the darkened area 501 because their spatial dimensions are determined as the minimum and maximum of each of the set of X, Y, and Z Cartesian coordinates of all the data points in a data block. That is to say, the bounding box 505 has a minimum and maximum of each of an X, Y, and Z extent according to the minimum and maximum X, Y, and Z value for data points 511-514 and bounding box 506 has a minimum and maximum of each of an X, Y, and Z extent according to the minimum and maximum X, Y, and Z value for data points 521-524. The following pseudo-code illustrates how the bounds are determined according to one embodiment of the invention:

```
Function ExtendBounds (Bounds, Point)
{
    If
    (Bounds.IsEmpty)
    {
        Bounds.Min=Point;
        Bounds.Max=Point;
    }
    Else
    {
        Bounds.Min.X = Min(Bounds.Min.X, Point.X);
        Bounds.Min.Y = Min(Bounds.Min.Y, Point. Y);
        Bounds.Min.Z = Min(Bounds.Min.Z, Point.Z);
        Bounds.Max.X = Max(Bounds.Max.x, Point.X);
        Bounds.Max.Y = Max(Bounds.Max.Y, Point. Y);
        Bounds.Max.Z = Max(Bounds.Max.Z, Point.Z);
    }
}
```

Returning again to Step 109 of FIG. 3, the computer preferably generates the bounds for the R-tree nodes by first initializing the bounds of the data block stored at Step 106 to empty. For each data point added to the data block, the computer extends the bounds of the index, using a computer-implementable version of the pseudo-code. Step 109 is performed preferably on leaf data blocks, although the step may be performed on all data blocks (including leaf data blocks, intermediate data blocks and the root data block) or on some predetermined subset of the data blocks. The leaf data blocks may be the only blocks indexed because an R-tree index is preferably used, which is sufficiently flexible to allow construction of intermediate 3D-index nodes by the union of two or more higher-level 3D-index nodes, as will be discussed in more detail to follow. If Step 109 is performed only on leaf data blocks, then lower-level data blocks are written to disk in Step 115 without being first indexed according to Step 109.

Once a sufficient number of data points are stored to fill a data block of the partition structure, at Step 115, the data block is written to disk or, stated another way, stored on disk. It will be appreciated that the laser system may not receive a return or echo for every pulse it transmits. Even in the absence of a valid return, the computer stores a point with a zero intensity value and a null range value, but, nevertheless, having $\phi$, $\theta$ spherical coordinates that are transformed into x, y Cartesian coordinates.

The entire scan need not be kept in memory, because data blocks of the scanned data are stored to disk as a data block is collected, freeing up the memory to store the next data block. The information associated with the data block, such as the R-tree bounds, are stored to disk with the underlying leaf data block point data. Of course, one of ordinary skill will appreciate that the associated information, like the R-tree bounds, may be written to disk at the end of the scan or any other time. The important thing is that the information is associated with its corresponding data block.

In some embodiments, the data blocks are stored on the disk efficiently, as shown in Step 117 of FIG. 3, in order to avoid blocking off portions of the disk unnecessarily. As an example of the efficient storage techniques according to such embodiments of the invention, consider a typical data block-size value N of 256. If the laser system scans 258 by 254 data points (i.e., 258 columns by 254 rows), the computer would, beforehand, create a canonical grid, in which M equals 512, that is, 512 columns by 512 rows, where the data actually starts at coordinate 0, 0, (as seen at 405 in FIG. 4) and empty points fill the remaining columns and rows above the actual scanned data (i.e., column 258+, row 254+).

This generates a partition structure of two levels, such as the two-level quad-tree 400 shown in FIG. 4. As illustrated in FIG. 4, there are four data blocks 410 (also referred to as "Block 1"), 420 (also referred to as "Block 2"), 430 (also referred to as "Block 3"), and 440 (also referred to as "Block 4") at the highest level of the partition structure (i.e., Level 1). As further illustrated in FIG. 4, the block layout of Level 1 has two empty data blocks (block 420 and block 440), one nearly empty data block (block 430), and one nearly full data block (block 410). However, the computer will not store the empty data blocks 420 and 440, and will efficiently store the partially empty data blocks, so while the quad-tree may be sparse, there is nearly no impact on disk space.

Because the data blocks are independent, the computer can be programmed to perform as much, or as little, compression as may be desired, according to standard compression techniques. Generally speaking, compression of data blocks is desirable when compression reduces the file size significantly, and decompressing the data read off the disk is faster than loading an uncompressed data block.

Again returning to FIG. 3, the dashed lines indicate that Steps 112, 114, and 119 are optional in some embodiments. In Step 112, prior to writing each data block to disk, the computer may optionally build a 3D partition or index within the data block. Preferably, if this optional step is performed, the index is an octree. This can be done with little additional overhead to compute the R-tree representation of each block before writing the block to disk.

Another optional, though preferable, step is to build a three-dimensional index within the each data block, as shown in Step 114. Such an index will have additional levels of spatial filtering. To build such 3D index, the computer first establishes a canonical quad-tree structure within the data block just as if the block were itself an entire scan file such as discussed with regard to Step 112. In other words, the leaf-blocks, for example, contain N by N points, where N is a power of 2, so building the intra-block partition is the same process as described previously with respect to Step 100 and Step 102. Likewise, the 3D index is built the same way as described with reference to Step 109, and each node in the intra-block 3D index references a group of data points with the data block. The group of data points should preferably be indexed by rows and columns. The 3D index can be developed over the quad-tree structure as deeply or shallowly as desired. Preferably the intra-block 3D index is an R-tree. Such an R-tree index may require an additional, roughly 1% overhead storage for a 10 K by 10 K scan, where N equals 256, and a three-level R-tree index is used with six floats per bound.

Generally, optional Steps 112 and 114 are performed for leaf-blocks, and not intermediate blocks of the partition. However, one of ordinary skill will appreciate that even intermediate blocks can be partitioned or partitioned and indexed as described with respect to Steps 112 and 114.

Preferably, in Step 119, other data besides the three-dimensional spatial coordinates of each data point are stored and associated with the data blocks. This other data may include color, attributes, and intensity and may be independently loadable. Step 119 may be appropriate when certain data can be compressed more effectively as a coherent set of values of the same type. For example, intensity values can be compressed independently, where ZLIB compression can be applied to the list of intensity values.

Though it is not shown in FIG. 3, optionally, the computer establishes lower-level, 3D-index nodes by the union of 3D index nodes overlaid on the blocks according to Step 109. Different nodes can be formed by the union of existing nodes, a useful feature for building a multi-level R-tree. Preferably nodes in the 3D index correspond to nodes in the quad-tree partition.

Figure 6:
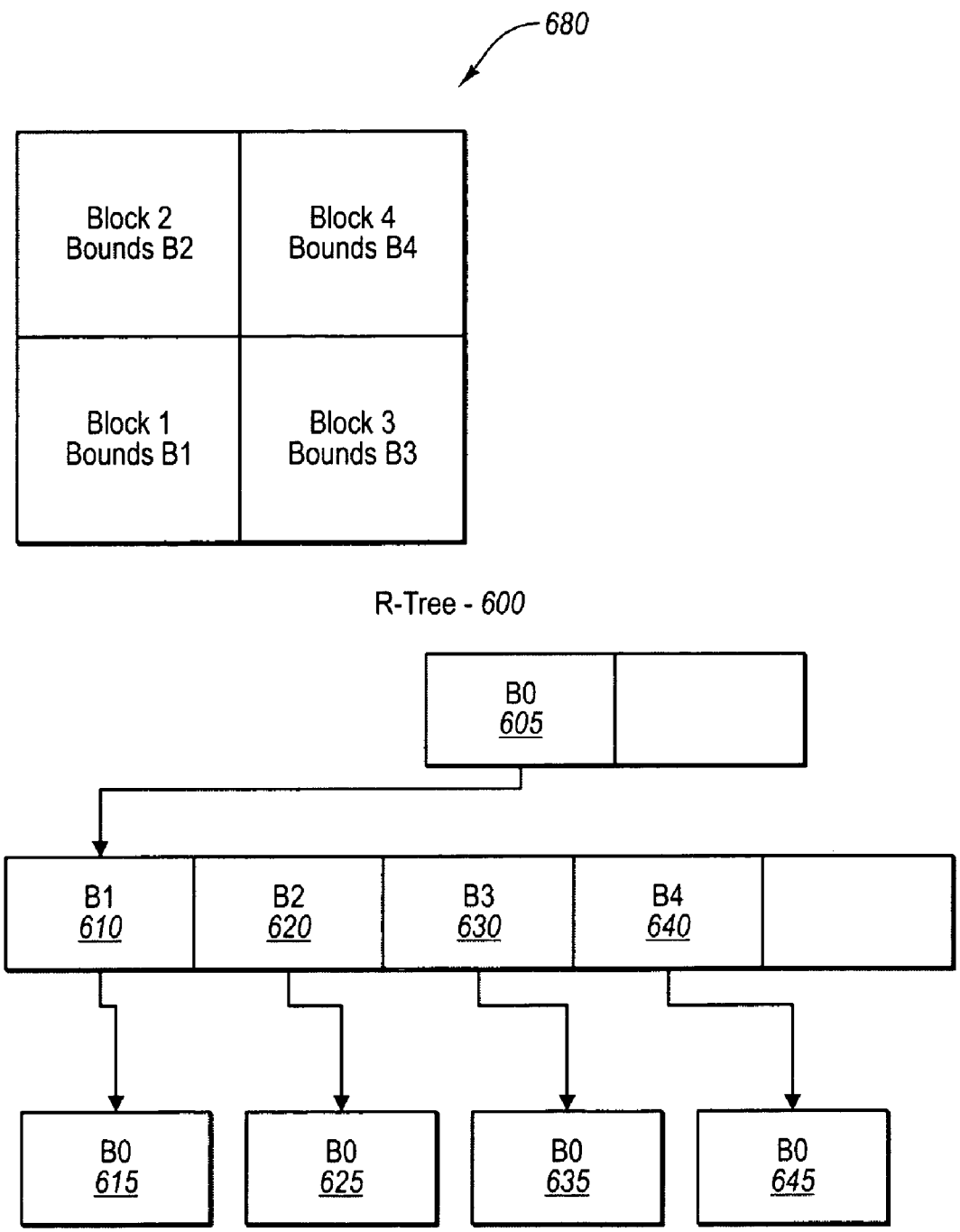
FIG. 6 illustrates a flexible 3D index.

Turning now to FIG. 6, a 3D index according to some embodiments disclosed herein is illustrated. In FIG. 6, an R-tree 600 consists of a 3D bounds pointing to a node, which may be another R-tree node or a node of a partition structure 680, which is also illustrated. Bounds B0 designated at 605 is the union of bounds B1, B2, B3 and B4, designated at 610, 620, 630, and 640 respectively. To explain the concept more fully, data Blocks 615, 625, 635, and 645 (also referred to as Blocks 1 through 4) in FIG. 6 are the leaf-blocks (or nodes) of the quad-tree 680 according to embodiments disclosed herein. Bounds 610, 620, 630, and 640 may be intermediate nodes of the 3D index that point to respective data blocks or nodes of the partition 680. The Bounds 610, 620, 630, and 640 can be created according to Step 109, for example. As already mentioned, Bound 605 is created by the union of Bounds 610, 620, 630, and 640.

Returning again to FIG. 3, in Step 124, the 3D index bounds (or, in some embodiments, R-tree bounds) are stored in a scan file header. The scan file comprises the point data for the entire scanning project or scan, as well as certain file-wide information relating to partitioning structure. Once the data has been stored according to the embodiments described up to this point, the data is virtually immediately ready for user viewing and manipulation as will now be described in relation to FIG. 7.

Figure 7:
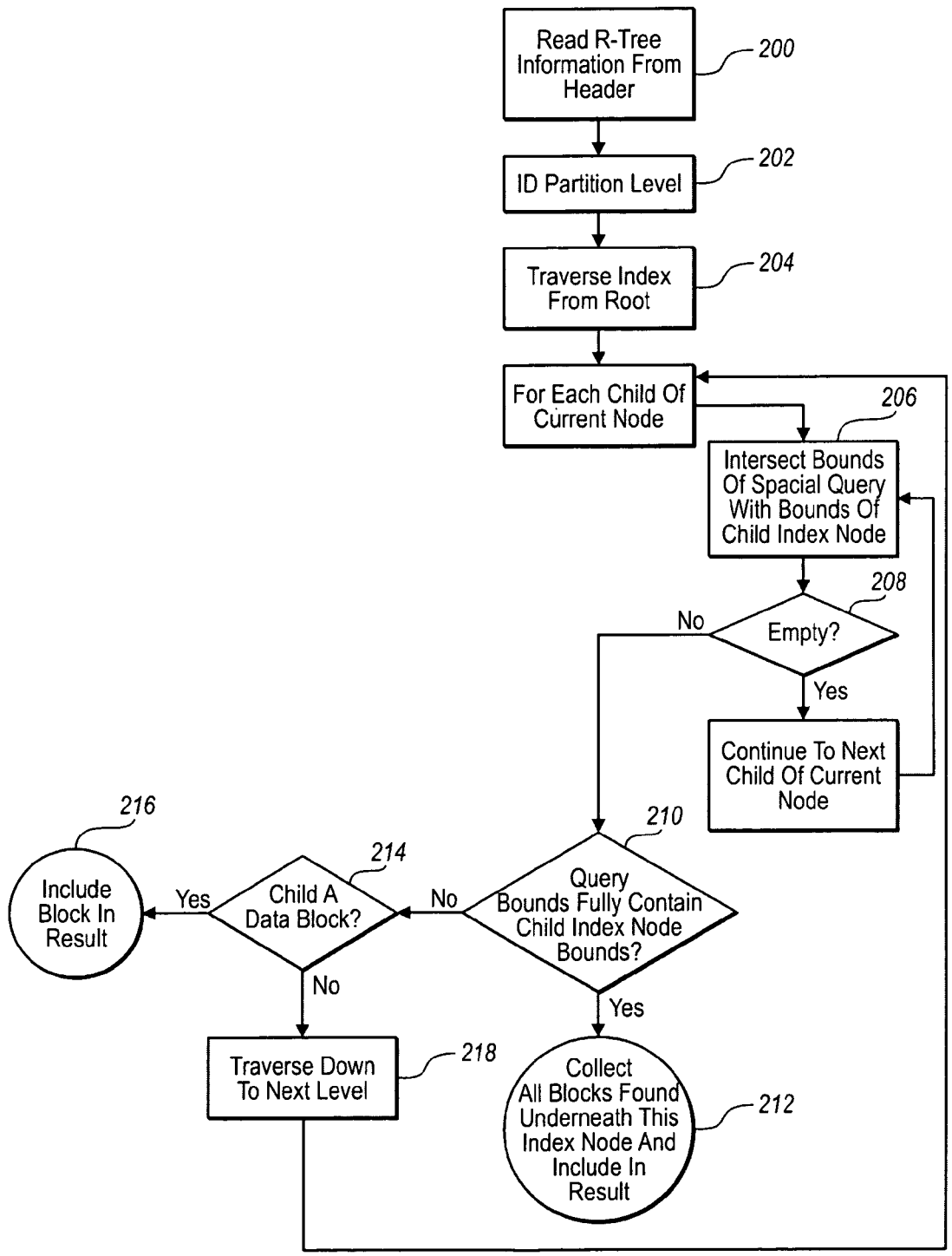
FIG. 7 is a flow-chart illustrating a process for querying 3D spatial data according to the preferred embodiment.

To support viewing and manipulation, the computer first reads the R-tree information from the scan file header, as shown in Step 200 of FIG. 7. The computer then identifies in Step 202 the partition level, preferably a quad-tree, which is appropriate to display based on the user's eye point and computes a spatial query for the data that will render the data according to the eye point. To actually find the data, the computer in Step 204 traverses the index from the root, and for each child of the current node, in Step 206 the computer compares or intersects the bounds of the spatial query with the bounds of the child index node, (That is, the child of the current node.)

If the intersection is empty (Yes in decision Step 208), the computer continues to the next child of the current node, in other words, the sibling of the current node, and then conducts the intersecting operation of Step 206 again. If the intersection is not empty (No in decision Step 208), the computer checks in decision Step 210 whether the spatial query bounds fully contain the child index node bounds. If so (Yes in decision Step 210), all data blocks within the bounds of the current index node are included in the result and displayed in Step 212. Otherwise (No in decision Step 208), when the query overlaps the child index node bounds, the computer checks whether the child corresponds to a block of data in decision Step 214. If so (Yes in decision Step 214), the data block is included in the result in Step 216. If not (No in decision Step the computer traverses down to the next level in Step 218 to begin the process again.

Figure 8:
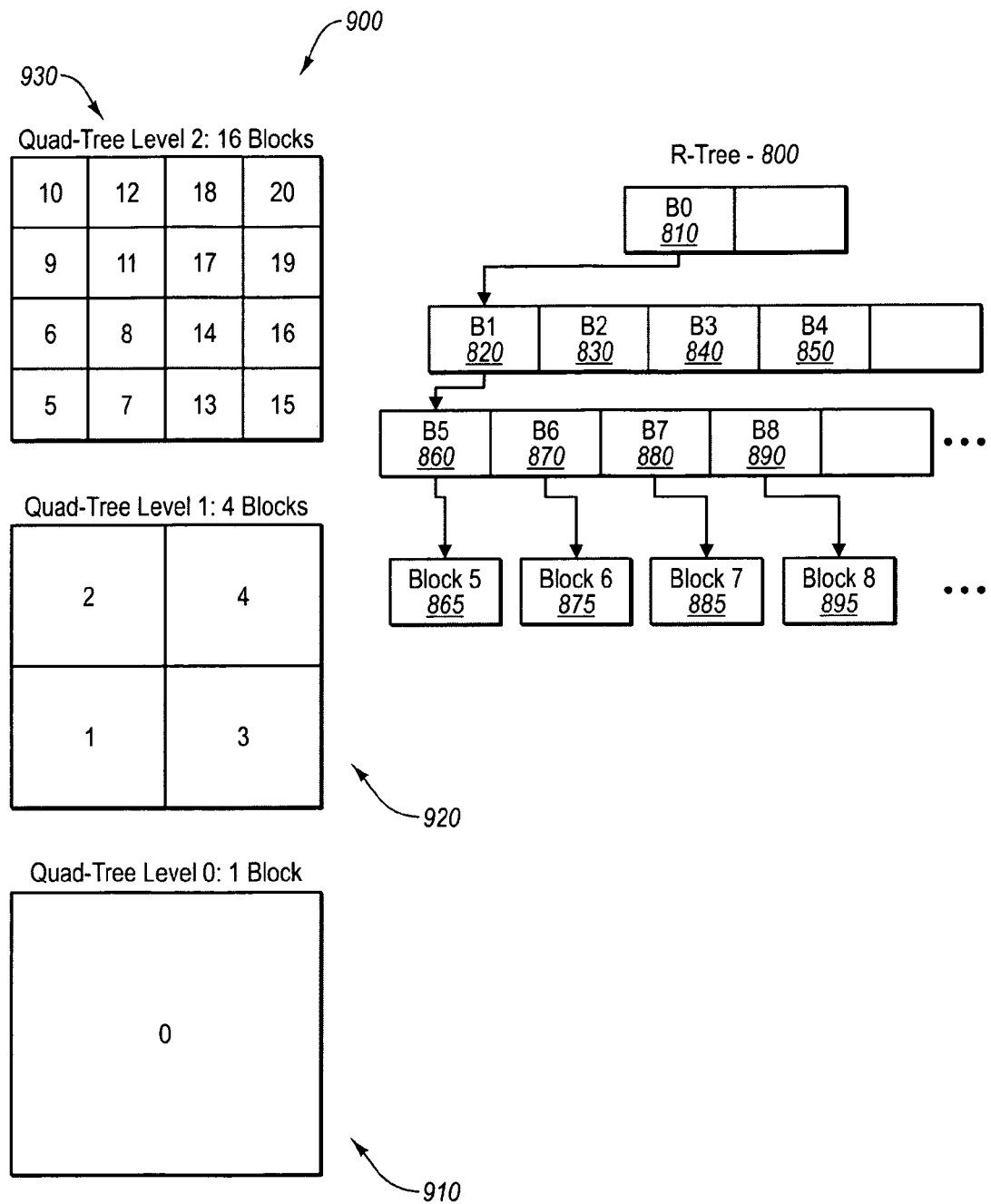
FIG. 8 illustrates the process for traversing the flexible 3D index and the partition structure according to the preferred embodiment.

Referring now to FIG. 8, a graphical illustration of the process of FIG. 7 is shown. Assume that the point data has been partitioned into a quad-tree 900 which includes three quad-tree levels. Level 0 designated at 910 is a quad-tree root node with point data at a low resolution when displayed. Level 1 designated at 920 is an intermediate quad-tree node with point data at a medium resolution. Level 2 designated at 930 is a leaf-node comprising leaf-blocks containing the highest resolution of the scan data.

An R-tree 800 also has three levels, with each level preferably corresponding to the levels of the quad-tree 900. Bound B0 designated at 810 is formed by the union of all of its child nodes and is a root node. Bounds B1 through B4 designated at 820, 830, 840, and 850 respectively are intermediate nodes, and can be formed by the union of any number of child nodes. Bound B1 (820), for example corresponds to Block 1 of the quad-tree 900 and is formed by the union of 3D indices associated with Blocks 5, 6, 7, and 8 of the partition 900. Bound B1 is formed by the union of child nodes B5-B8, which are designated at 860, 870, 880, and 890 respectively.

Of course, it will appreciated that forming Bound B1 (820) by the union of indices associated with leaf-blocks is but one way of forming an intermediate node like Bound B1. As mentioned before, other ways include building the index for Block 1 of the quad-tree 900 as Block 1 is written to memory in the same way the index for blocks 5, 6, 7, and 8 are built according to Step 109 of FIG. 3. In other words, intermediate nodes can also be formed directly from intermediate blocks of the partition structure, rather than by the union of indices associated with leaf-blocks of the partition. Other methods can also be employed to build an R-tree, all with the purpose of improving the process of locating appropriate data blocks for viewing and manipulation.

Returning now to the example illustrated by FIG. 8, assume a user wishes to view a small portion of the scan file at high resolution, such that the desired data points are entirely within Block 5. To find and render the data points, the computer will begin at bound B0 (810), traverse to the first child, B1 (820), and test the intersection of the spatial query with the bounds of B1 (Step 206 in FIG. 7). Finding this intersection to be not empty, the computer determines whether the query bounds fully contain the bounds of bound B5 (860) (Step 210). It does not, because the data points desired to be viewed or manipulated spatially extend no further than the points bounded by Block 5, so the computer determines whether B5 corresponds to a block (Step 214). It does not, so the computer traverses down to Block 5 (865) (Step 218), to test again the intersection of the spatial query bound with the bounds of Block 5 (Step 206). The spatial query is smaller than the block B5, so the intersection is not empty (according to the test at Step 208) and the computer goes on to again query whether the query bounds fully contain Block 5 (Step 210). They do not, so the computer determines whether Block 5 corresponds to a data block (rather than an R-Tree node), and it does, ending the process by returning Block 5. This Block 5 may be even further filtered, if desired. It will be appreciated that a similar process may be followed when the user desires to view the data points in block 6 (875), block 7 (885), or block 8 (895).

Having described the preferred embodiment in detail, certain additional information follows. First, the granularity of the process according to the preferred embodiment is controlled by the block size N. If fine-grain access is common or desirable, a small value of N may be used. Second, it should be noted that each block of point data may be stored in a different coordinate system from its sibling data in the scan file. This may happen where a user collects a plurality of related scans and wishes to combine them into a single, large scan project. The data can be transformed into a common, world coordinate system according to well-known principles. (U.S. Pat. No. 5,988,862 discloses, among other things, one way to register point clouds at col. 20, line 7, et seq.). The user need simply establish the coordinate transformation for each block or set of blocks that are related by having the same coordinate system to some world coordinate system that will be common to all of the scans in the project. By transforming the queries and results, multiple, registered scans can be viewed in 3D.

One of ordinary skill will appreciate that each level in the partition of the point data is independently stored and loadable. The user can access the level of resolution that he needs for any request, without accessing all of the blocks on disk. For example, if one wants to do a very course visualization (e.g., if he is zoomed out), all he needs to load is the block from level zero. By decomposing the storage at each level into N by N blocks, the computer can access each block separately, making disk access efficient.

Embodiments herein may comprise a special purpose or general-purpose computer including various computer hardware. Portable media devices are examples of special purpose computers. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of using a laser-measurement device which scans in a regular pattern in two dimensions and that collects data having three-dimensional attributes, the data having the regular pattern in two dimensions, the method comprising the steps of:
    determining a partition structure for the data based on the regular pattern of which the laser-measurement device scans before initiating a scan;
    initiating the scan and, while the scan progresses, collecting the data in memory until the data fits a size criteria associated with the partition structure;
    writing a block of data to disk when the data fits the size criteria;
    before writing the block to disk, establishing an index based on the three-dimensional attributes of the data, the index corresponding to the block of data;
    identifying a partition level which is appropriate to display based on a user's eye point;
    determining a spatial query that will render the data according to the eye point; and
    querying the data, including comparing the spatial query to the index.

2. The method according to claim 1, wherein the partition structure is a quad-tree.

3. The method according to claim 1, wherein the index is an R-tree.

4. The method according to claim 1, further comprising:
    storing the partition structure as a header file before the data is collected.

5. The method according to claim 1, further comprising establishing a boundary based on three-dimensional attributes of the data; and
    comparing the spatial query to the boundaries.

6. A laser system comprising:
    collecting means for collecting point data having three-dimensional coordinates, the collecting means collecting point data in a regular pattern in two dimensions such that the point data have a regular pattern in two coordinates; and
    means for performing the method of claim 1.

7. A computer-readable storage media having computer-executable instructions stored thereon, wherein when executed performs the method of claim 1.

* * * * *